United States Patent [19]

Brockwell

[11] 4,394,717

[45] Jul. 19, 1983

[54] ILLUMINATION SYSTEM FOR COPYING APPARATUS

[75] Inventor: Malcolm G. Brockwell, Ilford, England

[73] Assignee: Ciba-Geigy AG, Basel, Switzerland

[21] Appl. No.: 342,616

[22] Filed: Jan. 25, 1982

[30] Foreign Application Priority Data

Feb. 2, 1981 [GB] United Kingdom ............... 8103075
Apr. 15, 1981 [GB] United Kingdom ............... 8111884

[51] Int. Cl.³ .................................................. F21V 7/00
[52] U.S. Cl. ........................................ 362/247; 362/97; 362/297; 362/307; 362/310; 362/346; 362/375
[58] Field of Search ............... 362/247, 97, 297, 307, 362/310, 346, 375

[56] References Cited

U.S. PATENT DOCUMENTS 3,425,778  2/1969  Raczynski et al. ..................... 362/97

FOREIGN PATENT DOCUMENTS

| 932880 | 8/1955 | Fed. Rep. of Germany . |
| 1774380 | 9/1958 | Fed. Rep. of Germany . |
| 1158823 | 12/1963 | Fed. Rep. of Germany . |
| 1447459 | 3/1970 | Fed. Rep. of Germany . |
| 102821 | 10/1974 | Fed. Rep. of Germany . |
| 1539468 | 1/1979 | United Kingdom . |

Primary Examiner—Stephen J. Lechert, Jr.
Attorney, Agent, or Firm—Harry Falber

[57] ABSTRACT

The system comprises two light sources which are diametrically opposed relative to the optical axis of the system. In the axis there is provided a light-mixing mirror which has a generally sulcated face having grooves therein of triangular cross-section and raised portions of triangular cross-section separating the grooves. Light coming from the two light sources slightly diverges when it impinges the sulcated face of the mirror and is deflected into the direction of the optical axis thereby being intensively mixed.

7 Claims, 3 Drawing Figures

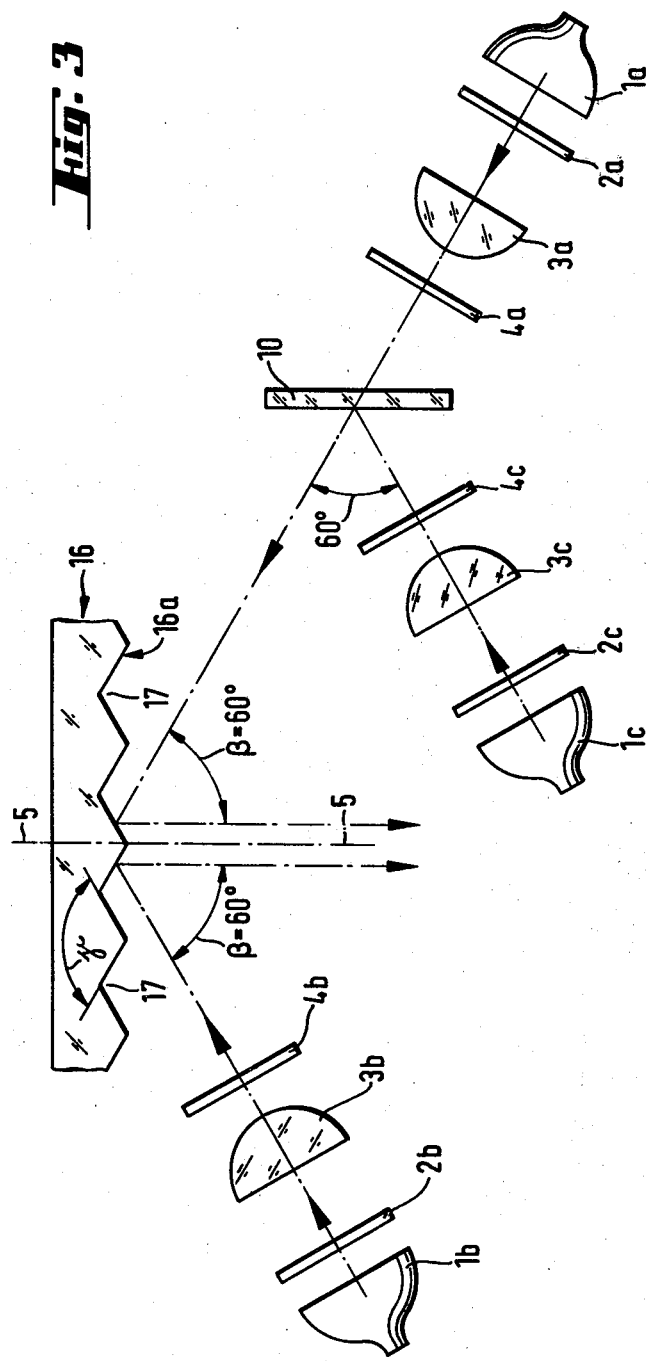

ILLUMINATION SYSTEM FOR COPYING APPARATUS

This invention relates to photographic copying apparatus and to a light mixing means for use therewith.

In photographic copying apparatus of the projection printing type as opposed to the contact printing type light from a light source is directed through a photographic transparency and then focussed on to a photosensitive print material located beneath by a lens system to expose the photosensitive material.

For some photographic printing purposes it is required that the photosensitive material is exposed simultaneously to light from at least two light sources. Such light sources usually emit light in different wavebands. Examples of printing of variable contrast black and white photographic material and the printing of colour print material.

Certain difficulties are encountered when it is required to use simultaneously light from at least two light sources, and the chief of these is the necessity to mix the light from the two sources as completely as possible. The necessity to adequate mix light from two sources has led to the production of printing apparatus with very large light mixing chambers which make the apparatus very bulky and of low light utilisation efficiency, for example the large integrating boxes: BP. No. 1539468, the long clear rods: U.S. Pat. No. 4,129,372 and long internally reflecting mixing ducts: U.S. Pat. No. 4,132,478.

In other prior art specifications various diffusing means are employed for scattering light rather than reducting light. For example the enlarger of U.S. Pat. No. 3,923,394 employs a sandwich of matte plates and the enlarger of U.S. Pat. No. 3,897,147 employs a box with a peaked roof.

We have discovered a light mixing means for use with a photographic copying apparatus which is not bulky, which mixes well the light from the two sources but nevertheless is efficient in the use of the light.

According to the present invention there is provided an illumination system for a photographic copying apparatus for mixing light from two sources, which illumination system comprises disposed along a longitudinal axis a light-mixing mirror which has as the light-mixing face a generally sulcated face having grooves therein of triangular cross-section and raised portions of triangular cross-section separating the grooves such that alternate facets are parallel, said two light sources being diametrically opposed relative to the longitudinal axis and located below the sulcated face and each being adapted to direct light onto said light-mixing member from an angle relative to said longitudinal axis which is twice the complement of the angle made by one of the sets of said parallel facets relative to the longitudinal axis, the general plane of the sulcated face of the light-mixing mirror being disposed normal to the said longitudinal axis and the grooves therein having smooth polished reflecting surfaces and extending normal to a plane containing both light sources and the longitudinal axis, light from the two light sources striking the light-mixing mirror and being reflected therefrom substantially along the longitudinal axis.

When the light is reflected mixed from the light-mixing mirror it passes through a condenser lens or a diffusing screen or both, and thence through a photographic transparency, through an objective lens to the photosensitive material to effect exposure thereof.

In the illumination system of the present invention a particularly suitable arrangement is that the apex angle of each of the raised portions of triangular cross-section should be 120° and that light from the two light sources is directed onto the light-mixing mirror at 60° relative to the longitudinal axis.

However, it may be desirable for other reasons, e.g. mechanical configuration, to choose alternative triangular cross-sections in which case some efficiency may be lost but the mixing principle will still work effectively.

The optical systems employed to direct light from the light sources onto the sulcated face of the light-mixing member are such that the beams of light are slightly diverging. That is to say they diverge from the parallel by up to 10°. This is to ensure that the beams of light which are split up by the sulcated face of the mirror overlap so that in the light pattern there are no discrete areas of unmixed one colour light.

The facets of the light-mixing mirror need to be placed beyond the focal plane of the condenser lens used for collecting the light to avoid a banded light structure being formed on the transparency.

Usually, that is to say for most purposes, a colour selective filter is present in the path of the light from at least one of the two sources and most generally colour selective filters of different characteristics are in the paths of light from both of the two light sources.

In a modification to the illumination system of the present invention one of the two light sources comprises two lamps and a beam splitter is present which functions as a beam combiner, the two lamps being so arranged that a single beam of light from the beam splitter is directed on to the sulcated face of the light-mixing mirror at an angle of substantially 60° relative to the longitudinal axis of the system. The beam splitter used as the beam combiner may be colour selective.

Preferably the reflective coating of the facets of the sulcated mirror consists of a dichroic coating which reflects the actinic components of the light but transmits infra-red radiation. This helps to prevent infra-red radiation heating up the negative and optical components of the system.

The accompanying drawings will serve to illustrate the invention. It is to be understood that the drawings do not include parts of the photocopying apparatus such as the negative holder, the print material holder and the light objective lens system which are not part of the illumination system of the present invention.

FIG. 3 is a diagrammatic cross-sectional side elevation of a modification to the illumination system illustrated in FIG. 1.

Figure 1:
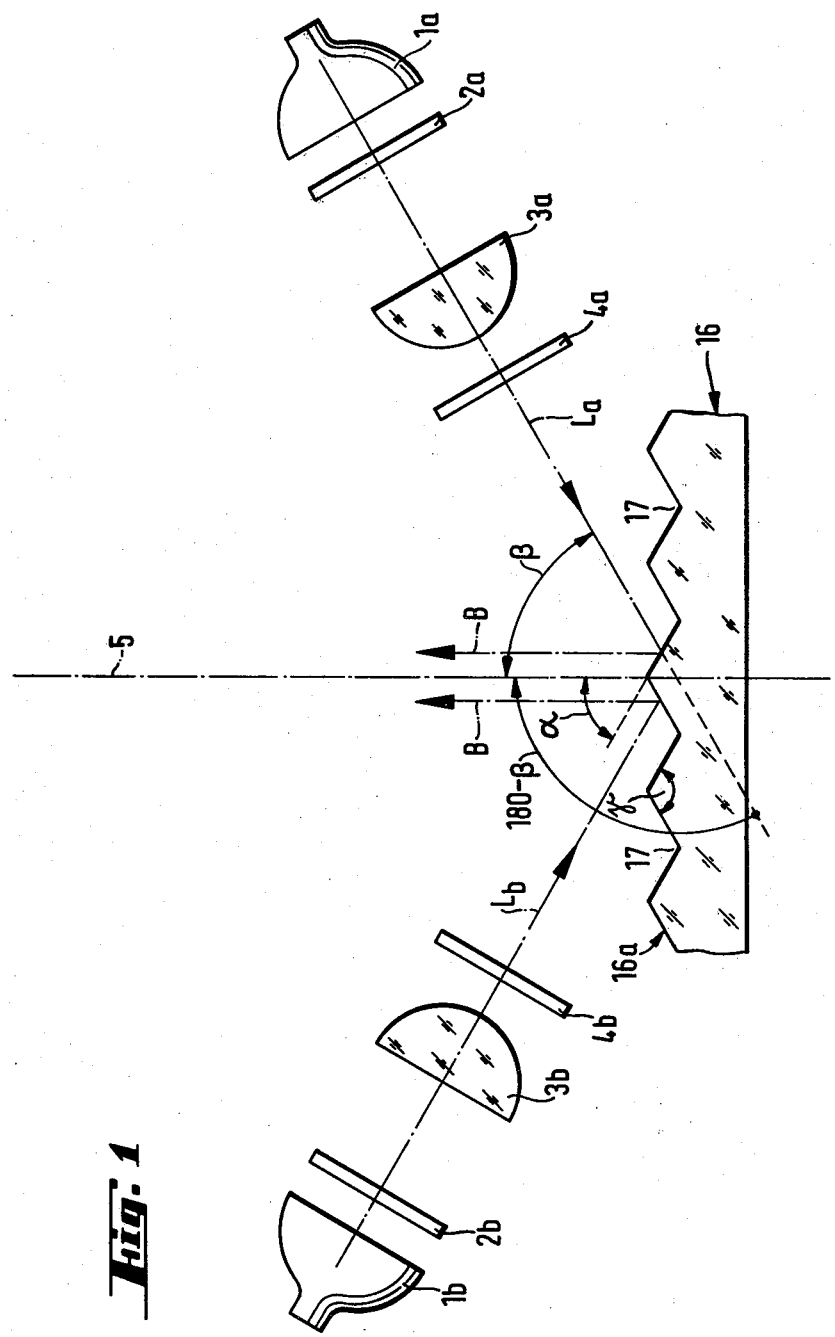
FIG. 1 is a diagrammatic cross-sectional side elevation showing the relative disposition of the various components.

In FIG. 1 there is shown an illumination system for a photographic copying apparatus which comprises two light sources each of which consists of a filament lamp 1 (*a* and *b*), a heat filter 2 (*a* and *b*), a condenser lens 3 (*a* and *b*) which act as partial collimators, and a colour filter 4 (*a* and *b*). In practice 1*a* and 1*b*, 2*a* and 2*b* and 3*a* and 3*b* will be identical but 4*a* and 4*b* will be different, passing light in different but possible overlapping wavelengths. The optical axis is indicated by line 5. The light from each light source passes to the light-mixing mirror 16 which bears on its face 16a a series of grooves 17 of triangular cross-section. The cross-section area of each groove forms an isosceles triangle, the apex angle $\gamma$ of this triangle, located at the bottom of the groove, is 120°.

A ray of light $L_a$ from the light source 1a is directed to the light-mixing mirror 16 at an angle of 60° to the optical axis 5, this is indicated as angle $\beta$. Ray $L_a$ when it strikes the face of the mirror 16 is deflected into a direction parallel to the optical axis 5 as indicated by arrow B, through an obtuse angle $(180-\beta)$ which is 120°. Similarly a ray of light $L_b$ from the light source 1b is directed to the light-mixing mirror 16 at an angle of 60° to the optical axis 5 and when it strikes the face of the mirror 16 it is deflected into a direction parallel to the optical axis 5 as indicated by arrow B through the obtuse angle of 120°.

Thus the angle between each of the light sources and the longitudinal axis is in this case 60° which is twice the complement of the angle $\alpha$ made by the facet to the longitudinal axis, this being 60°.

Similarly, if the apex angle $\gamma$ used was 150°, the angle of the facets relative to the longitudinal axis would be 75° and the required angle of incident light relative to the longitudinal axis would be twice the complement of 75° namely 30°.

Figure 2:
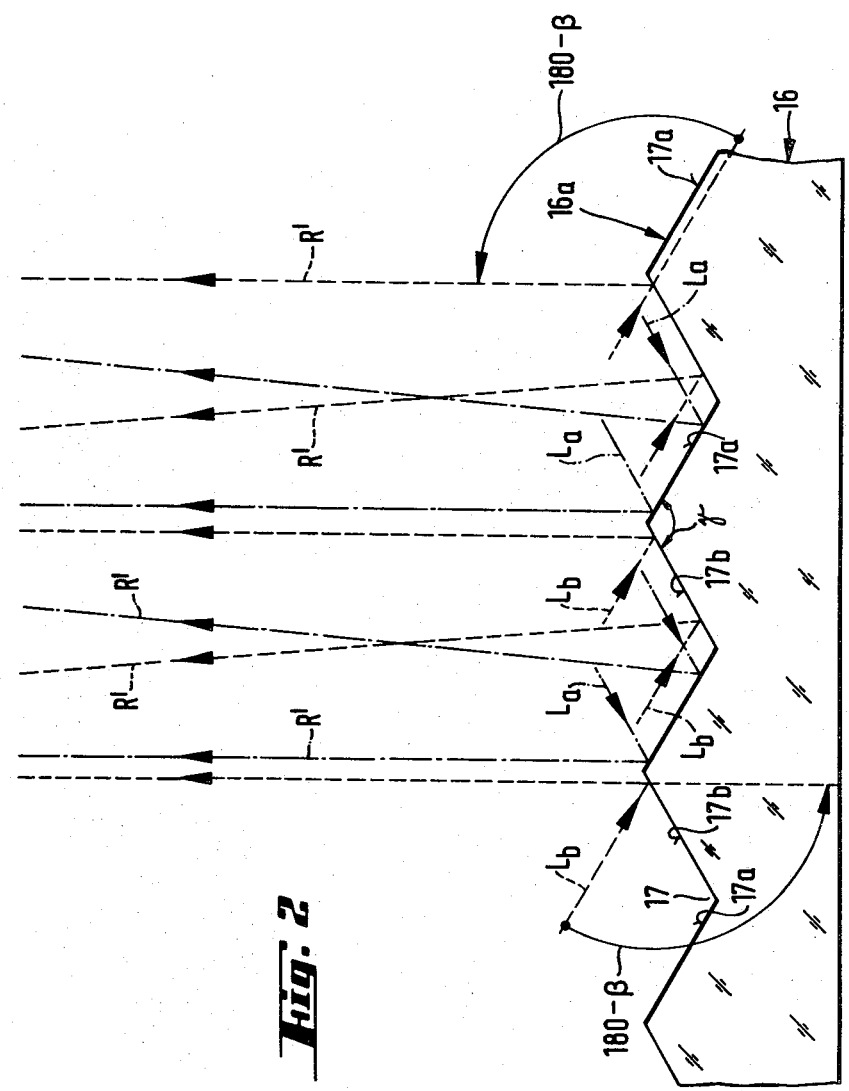
FIG. 2 is a cross-sectional side elevation of part of the light-mixing mirror showing the reflections and mixing of the beams from the two light sources.

As shown in FIG. 2, diverging light $L_a$ from light source 1a is incident onto the mirror facets of the series 17a, while light $L_b$ from light source 1b is incident onto the mirror facets of the series 17b, which alternate with the facets 17a and are inclined to them at an angle of approximately 120°. The whole of the light is reflected at these facets of the light-mixing mirror 16 and, in this process, is caused to diverge still more, so that rays of the emerging light R' overlap one another, and produce light which is largely or virtually completely mixed.

For the sake of ease of presentation and to indicate more clearly the path of light into the light mixing means only four grooves of equilateral triangular cross-section are shown. In practice many more may be used to provide completely adequate mixing of light.

For example in one apparatus the diameter of the light-mixing mirror 6 was 60 mm, the number of grooves on its surface was 29 and the divergence of the beams $\pm 7°$.

When high efficiency of light utilisation is particularly required a condenser lens system can be used according to known practice, to collect light emerging from the light-mixing mirror and to direct it through the film transparency and into the objective lens.

In FIG. 3 there is shown a modification of the illumination system of the present invention. In this figure the same numbers represent the same features as in FIG. 1 but there is present also another filament lamp 1c, another heat filter 2c, another partial collimating lens 3c and another colour filter 4c. There is also present a beam combiner 10. Light from lamp 1a passes straight through the beam combiner 10 while light from lamp 1c is reflected through 60° by the beam combiner and follows the same path as the light from lamp 1a to the light-mixing mirror 16.

Preferably the beam combiner 10 is a dichroic mirror which reflects light of the colour passed by colour filter 4c but transmits freely light of the colour passed by filter 4a.

Alternatively the beam combiner can be another sulcated light-mixing mirror. If it is required to expose the print material to three different wavelengths bands of light then colour filter 4c is different from both colour filter 4a and 4b. The waveband passed by filter 4b should then be intermediate between the wavebands passed by filters 4a and 4c. For example, filters 4a, 4b and 4c may be selected to pass red, green and blue light respectively. In some circumstances it is required to provide light in only two wavebands, but much more light of one colour is required than light of the other colour. In such a case both the filters 4b and 4c can be of the same colour, the light from lamp 1c being used to reinforce the light from lamp 1b when so required.

I claim:

1. An illumination system for a photographic copying apparatus for mixing light from two sources (1a, 1b), which illumination system comprises disposed along a longitudinal optical axis (5) a light-mixing mirror (16) which has as the light-mixing face (16a) a generally sulcated face having grooves (17) therein of triangular cross-section and raised portions of triangular cross-section separating the grooves such that alternate facets (17a, 17b) are parallel, said two light sources (1a, 1b) being diametrically opposed relative to the longitudinal axis (5) and located below the sulcated face (16a) and each being adapted to direct light onto said light-mixing mirror (1b) from an angle ($\beta$) relative to said longitudinal axis (5) which is twice the complement of the angle ($\alpha$) made by one of the sets of said parallel facets (17a, 17b) relative to the longitudinal axis (5), the general plane of the sulcated face (16a) of the light-mixing mirror (16) being disposed normal to the said longitudinal axis and the grooves (17) therein having smooth polished reflecting surfaces (17a, 17b) and extending normal to a plane containing both light sources and the longitudinal axis (5), light from the two light sources striking the light-mixing mirror (16) and being reflected therefrom substantially along the longitudinal axis.

2. An illumination system according to claim 1 wherein the apex angle ($\gamma$) of each of the raised portions of triangular cross-section is 120° and the light from the two light sources is directed onto the light-mixing mirror at 60° relative to the longitudinal axis.

3. An illumination system according to claim 1 or claim 2, wherein the optical systems employed to direct light from the light sources to the light-mixing mirror are such that beams of light from each source when they reach the sulcated face are slightly diverging.

4. An illumination system according to claim 1, wherein a colour-selective filter is present in the path of the light from at least one of the two sources.

5. An illumination system according to claims 1, wherein one of the two light sources comprises two lamps and a beam combiner is present, the two lamps being so arranged that a single beam of light from the beam combiner is directed on to the sulcated face of the light-mixing mirror at an angle of substantially 60° relative to the longitudinal axis of the system.

6. An illumination system according to claim 5 wherein the beam combiner is colour selective.

7. An illumination system according to claim 1, wherein the reflecting surface of the facets of the sulcated mirror consists of a dichroic coating which reflects the actinic components of the light but transmits infra-red radiation.

* * * * *